United States Patent
Zhu et al.

(10) Patent No.: US 11,320,212 B2
(45) Date of Patent: May 3, 2022

(54) THERMAL CONTROL SYSTEM

(71) Applicant: AGENCY FOR SCIENCE, TECHNOLOGY AND RESEARCH, Singapore (SG)

(72) Inventors: Qiang Zhu, Singapore (SG); Xiang Yun Debbie Soo, Singapore (SG); Tao Tang, Singapore (SG); Suxi Wang, Singapore (SG); Jianwei Xu, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 0 days.

(21) Appl. No.: 16/980,946

(22) PCT Filed: Mar. 15, 2019

(86) PCT No.: PCT/SG2019/050146
§ 371 (c)(1),
(2) Date: Sep. 15, 2020

(87) PCT Pub. No.: WO2019/177544
PCT Pub. Date: Sep. 19, 2019

(65) Prior Publication Data
US 2020/0408470 A1    Dec. 31, 2020

(30) Foreign Application Priority Data
Mar. 15, 2018   (SG) .............................. 10201802163P

(51) Int. Cl.
*F28D 15/00*    (2006.01)
*F28D 20/02*    (2006.01)
*C09K 5/06*     (2006.01)

(52) U.S. Cl.
CPC .............. *F28D 20/02* (2013.01); *C09K 5/066* (2013.01)

(58) Field of Classification Search
CPC .............................. F28D 20/02; C09K 5/066
(Continued)

(56) References Cited

U.S. PATENT DOCUMENTS

2009/0020264 A1*  1/2009  Morita .................. F28D 20/003
                                            165/104.12
2010/0071882 A1*  3/2010  Zhang ...................... B01J 13/22
                                            165/110

(Continued)

FOREIGN PATENT DOCUMENTS

CN    101508887 A    8/2009
CN    103351850 A    10/2013
(Continued)

OTHER PUBLICATIONS

Search Report and Written Opinion in International Application No. PCT/SG2019/050146 dated May 28, 2019, 13 pages.

*Primary Examiner* — Davis D Hwu
(74) *Attorney, Agent, or Firm* — Marshall, Gerstein & Borun LLP

(57) ABSTRACT

A thermal control system with new phase change material (PCM) formulations that are able to maintain the system interior in a temperature range of, for example, −15 to −40° C., for a tunable working period from several hours to approximately half a day, is provided. The composition includes the inorganic and organic materials. The inorganic materials include the inorganic salts and various functional additives; while the organic materials include fatty acids, hydrocarbons and various nanostructures.

20 Claims, 8 Drawing Sheets

(58) Field of Classification Search
USPC .................................................. 165/104.21
See application file for complete search history.

(56) References Cited

U.S. PATENT DOCUMENTS

2014/0261380 A1* 9/2014 Rademacher ......... A61F 7/0097
            126/263.01
2016/0251557 A1* 9/2016 Suzuki ................. F28D 20/023
            252/71

FOREIGN PATENT DOCUMENTS

| CN | 107573900 A | 1/2018 |
| CN | 107760274 A | 3/2018 |
| JP | 2015-134883 A | 7/2015 |
| WO | WO-2012/176708 A1 | 12/2012 |

* cited by examiner

[Fig. 1]
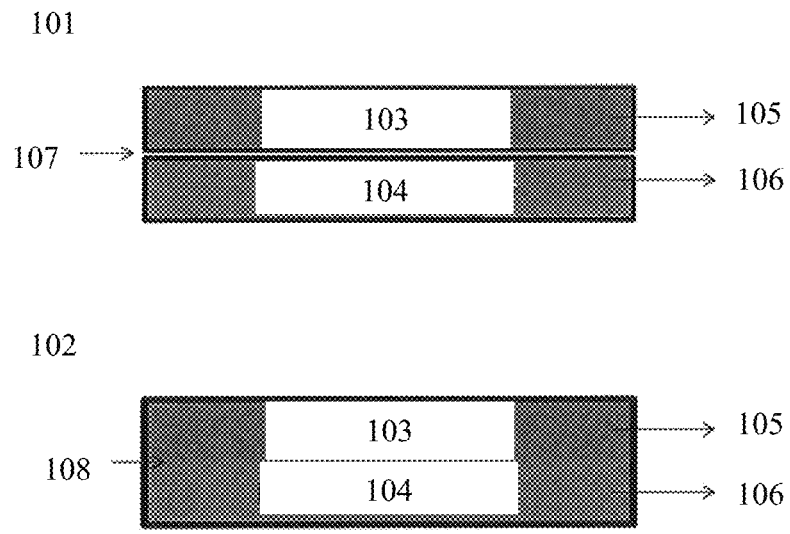
[Fig. 2]
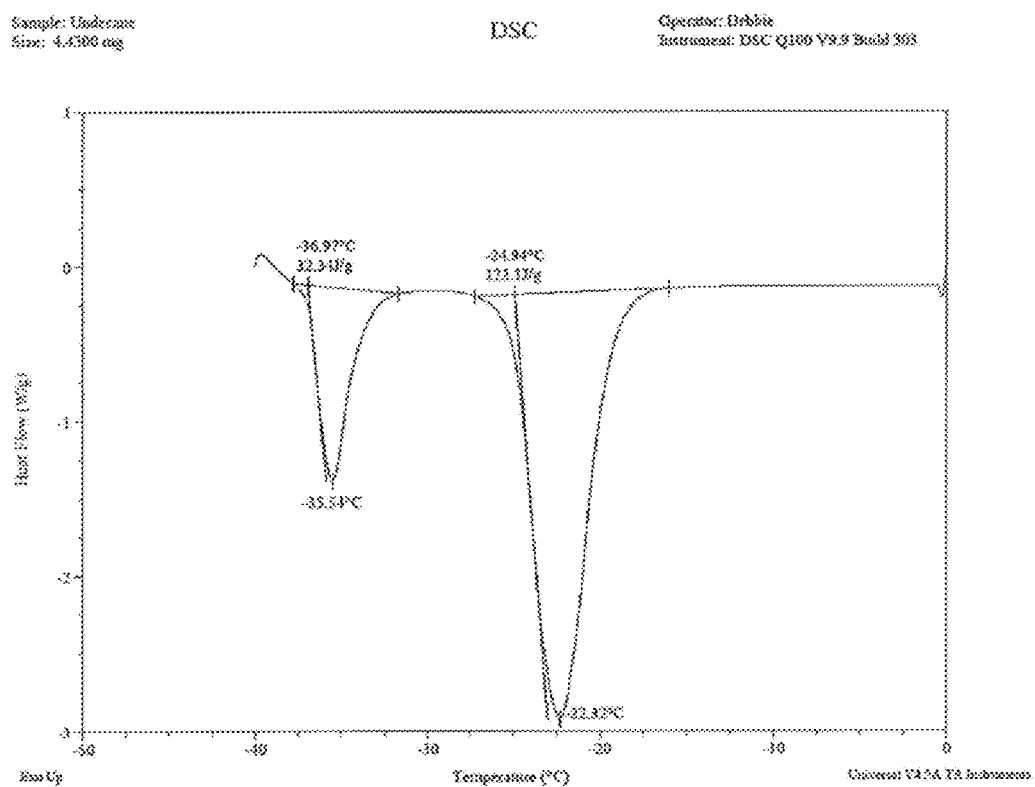

[Fig. 3]
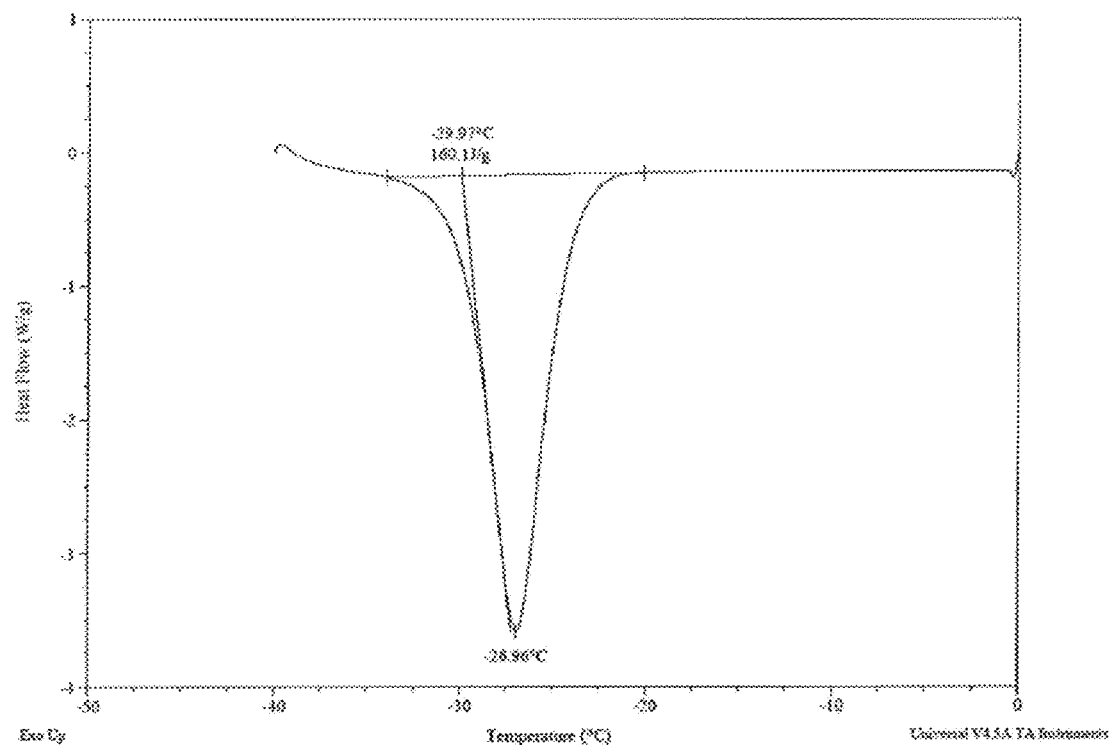

[Fig. 4]
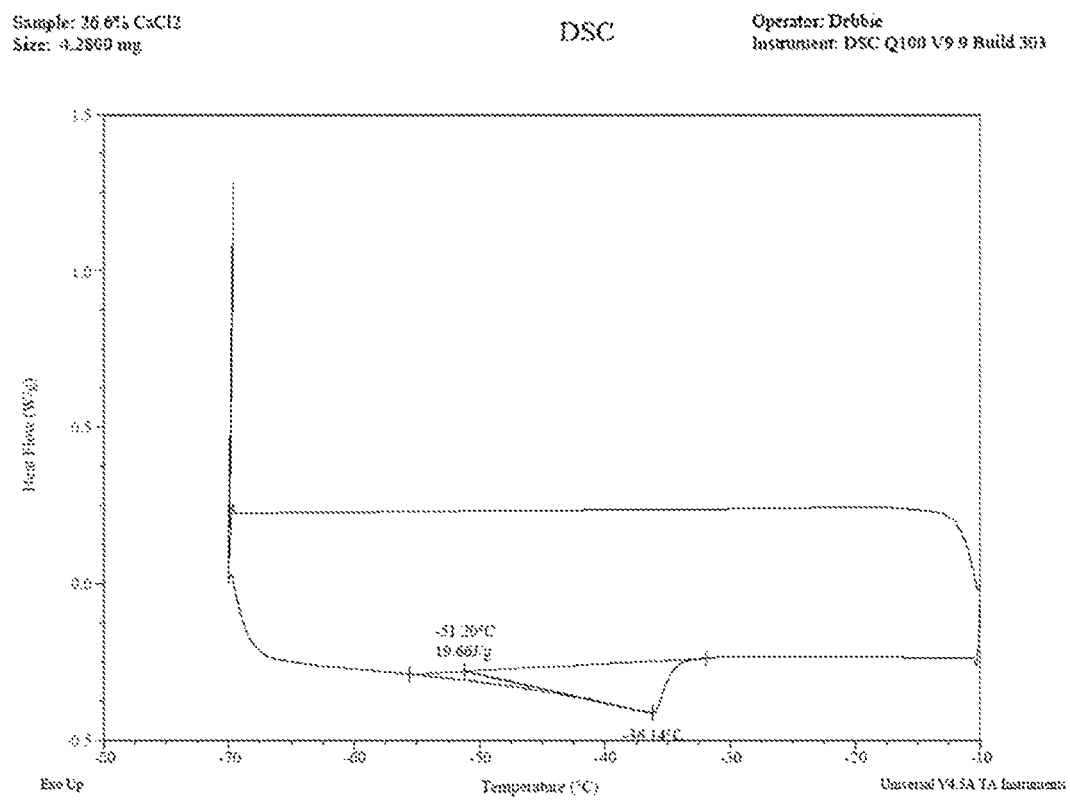

[Fig. 5]
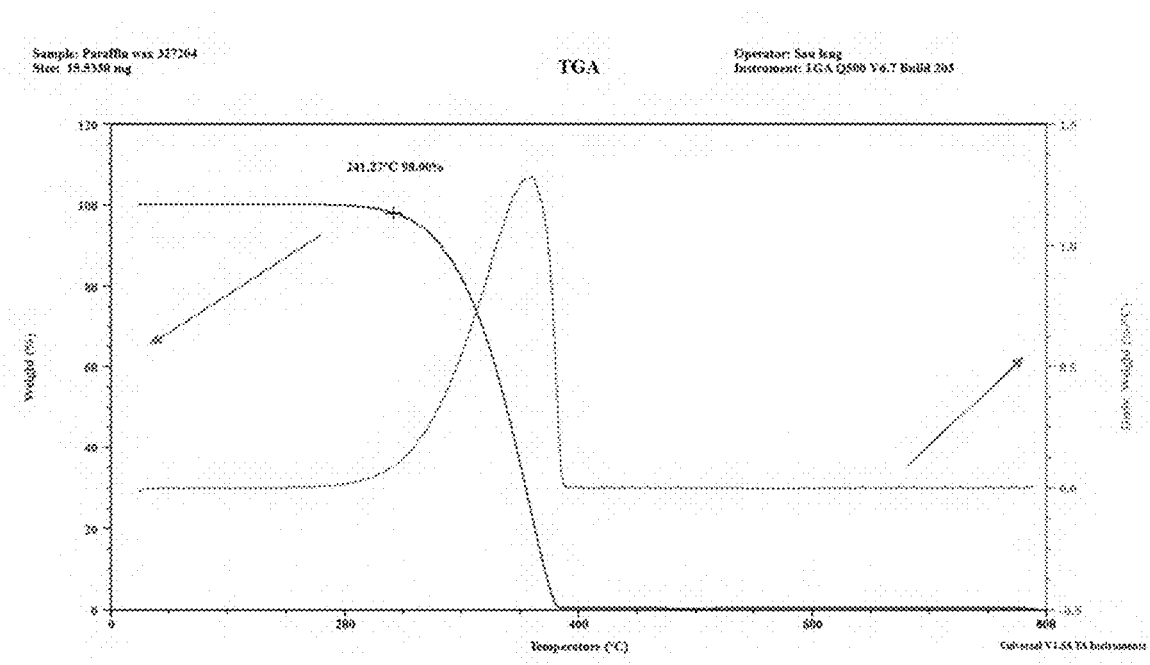
[Fig. 6]
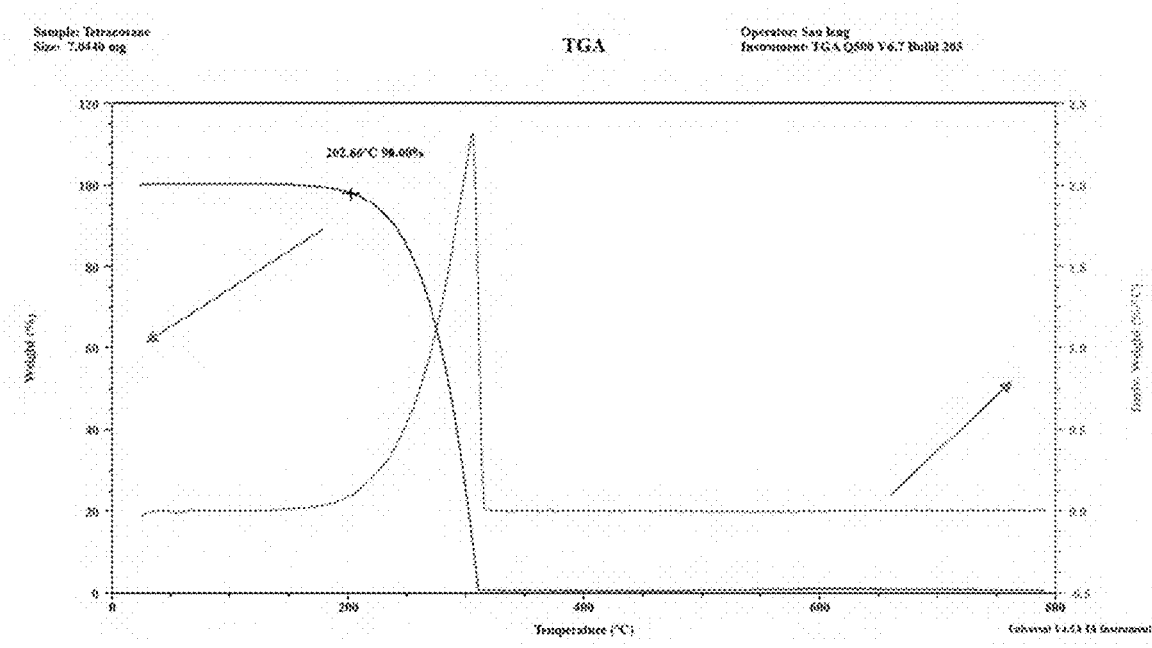

[Fig. 7]
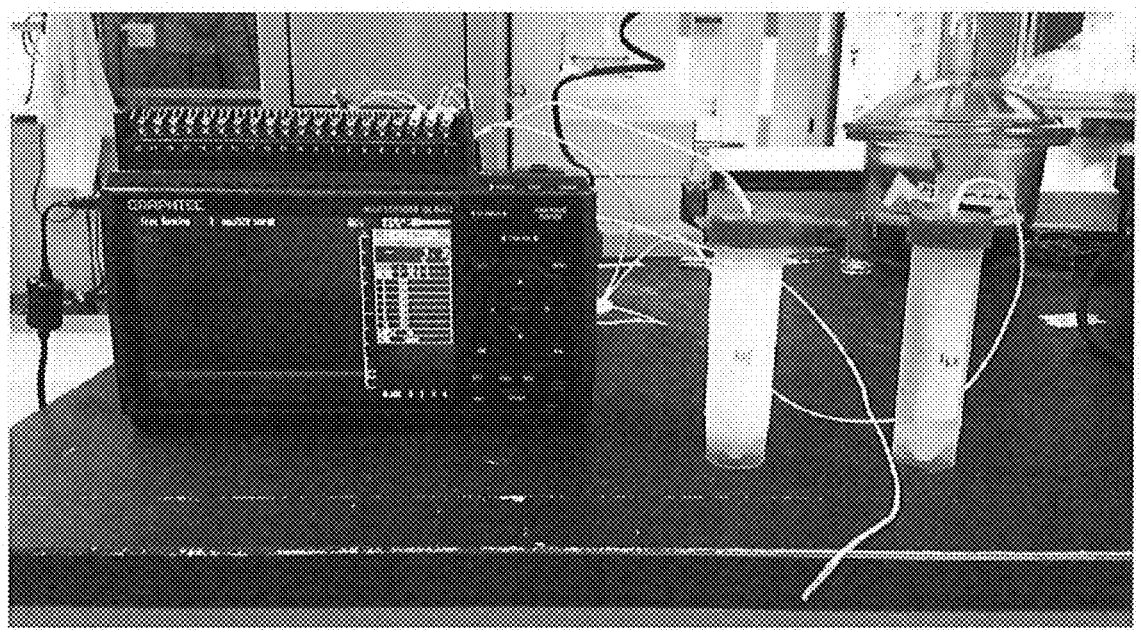
[Fig. 8]
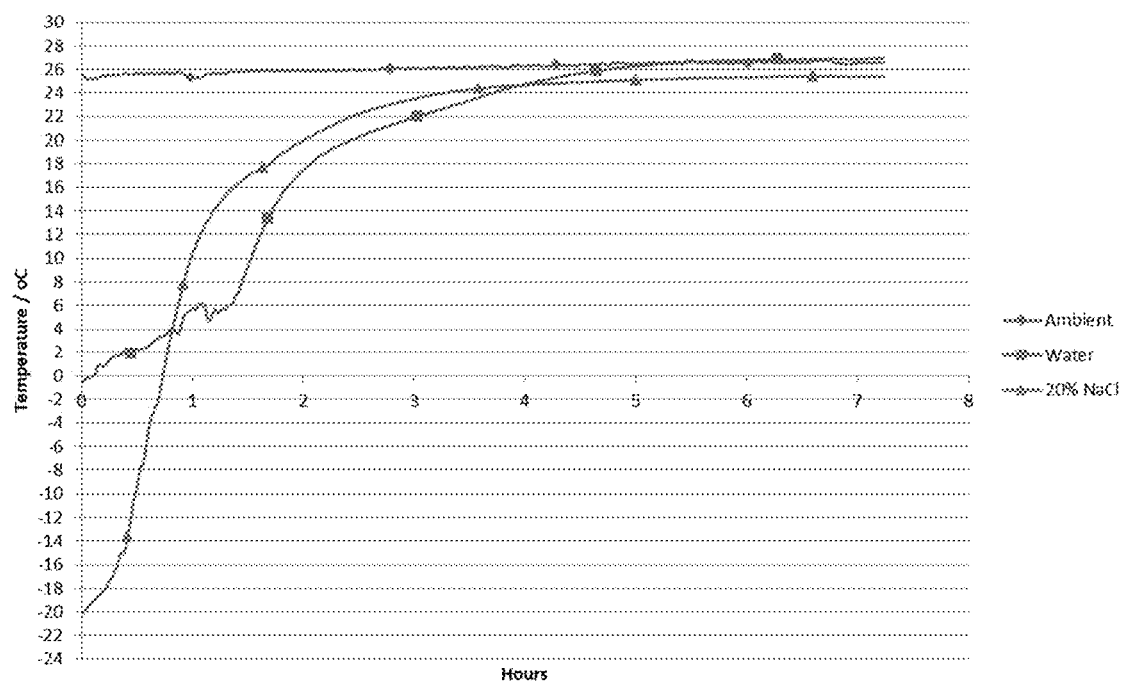

[Fig. 9]
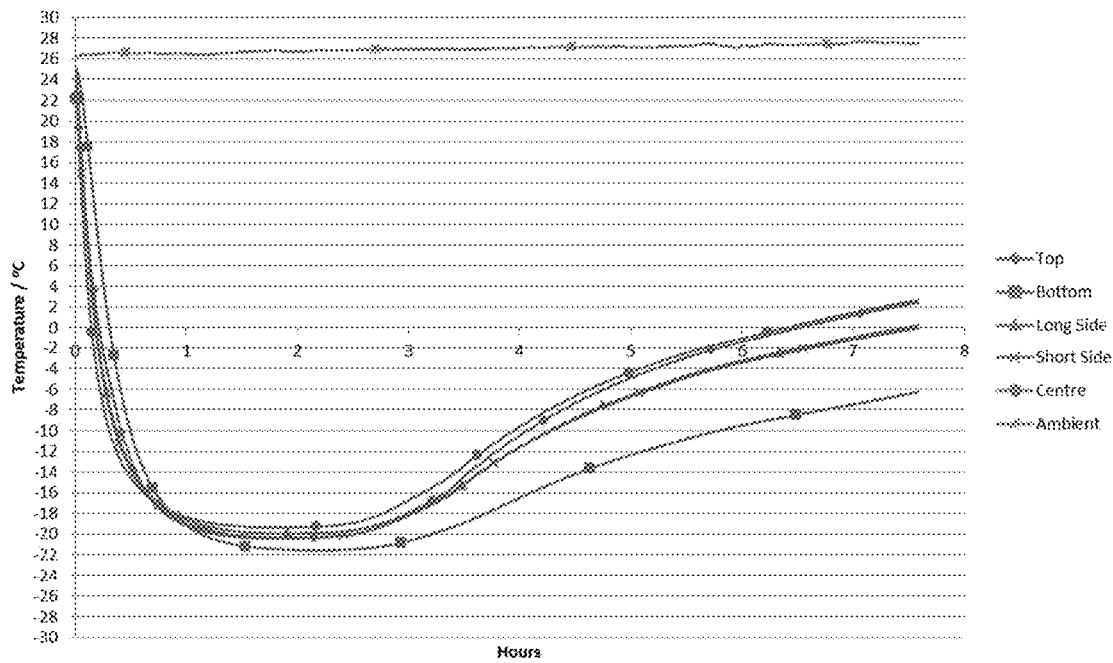
[Fig. 10]
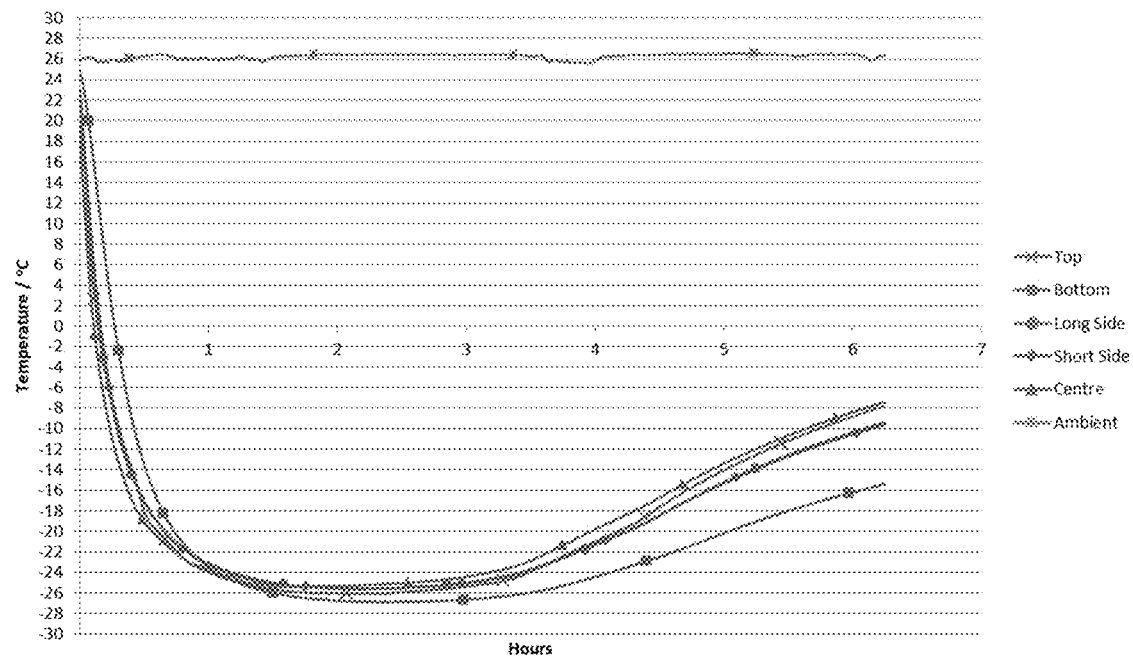

[Fig. 11]
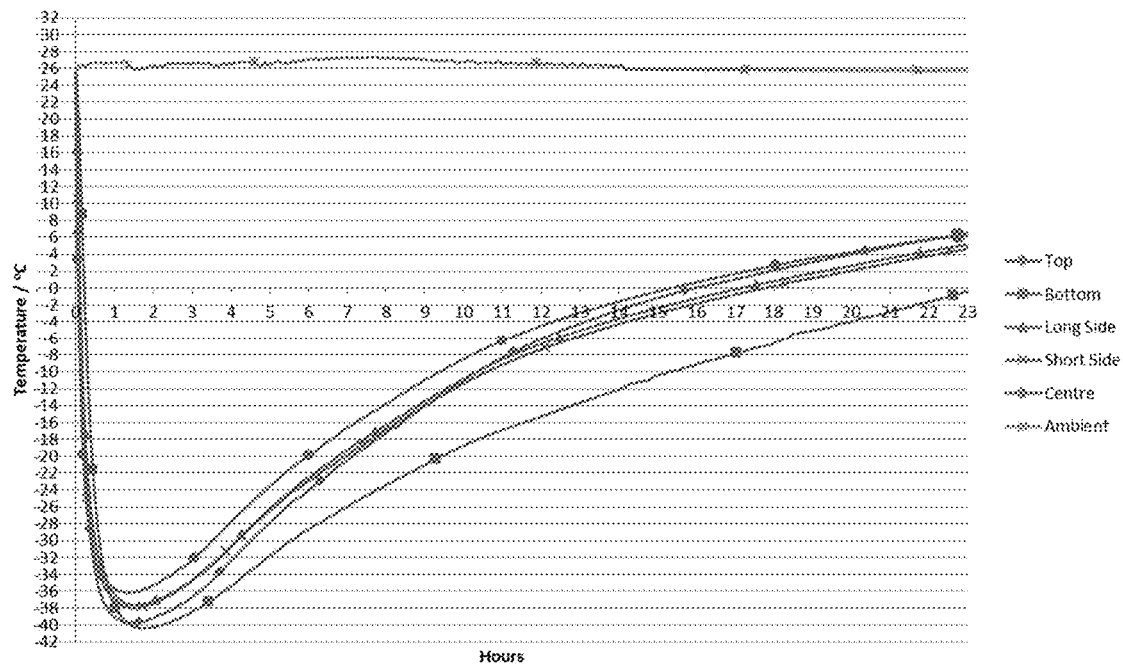
[Fig. 12]
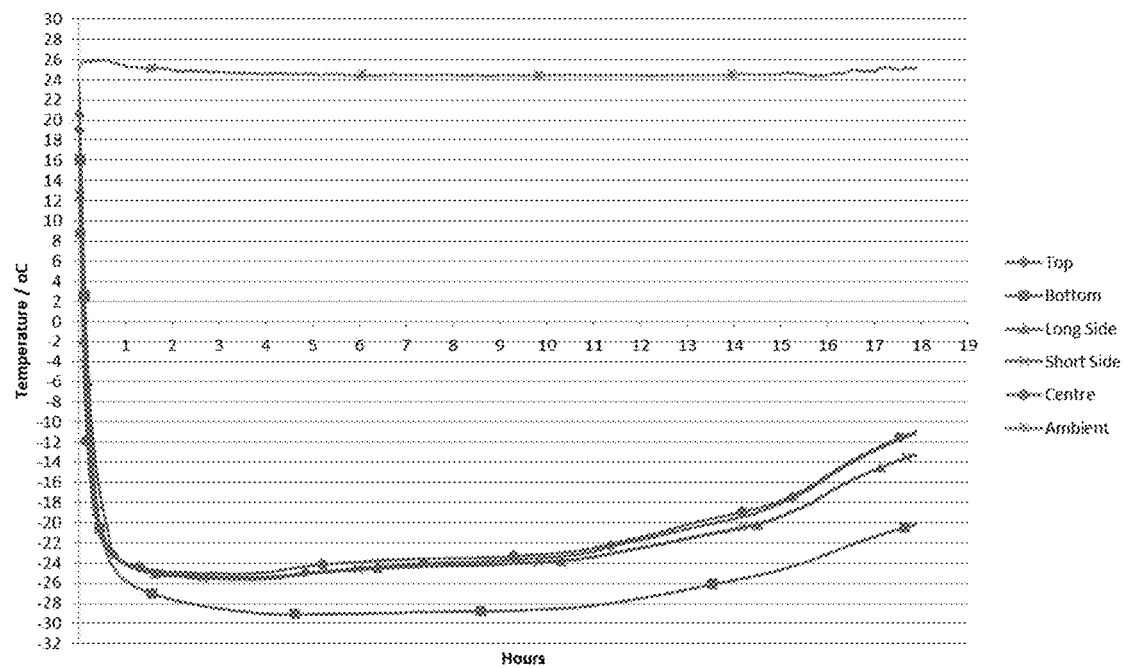

[Fig. 13]
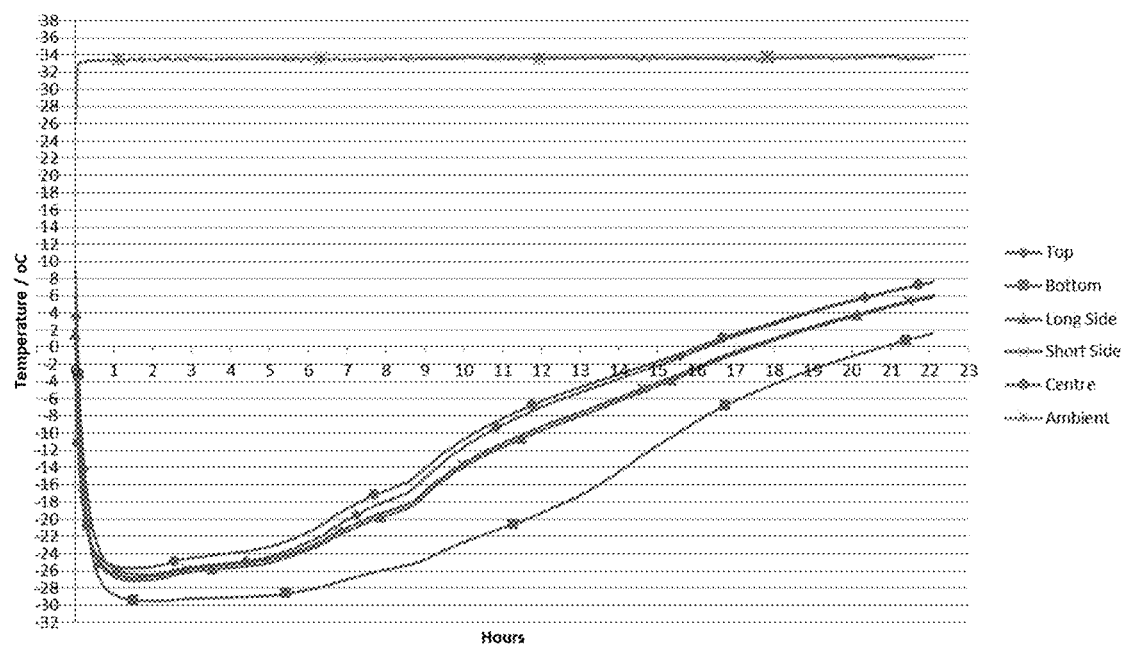

THERMAL CONTROL SYSTEM

TECHNICAL FIELD

A thermal control system with new phase change material (PCM) formulations that are able to maintain the system interior in a temperature range of, for example, −15 to −40° C., for a tunable working period from several hours to approximately half a day, is provided. The composition includes inorganic and organic materials. The inorganic materials include the inorganic salts and various functional additives; while the organic materials include fatty acids, hydrocarbons and various nanostructures.

BACKGROUND ART

There has been an increase in trading of goods and services within and between countries over the years, shaping up the interconnected landscape of globalization. Much of the commonly traded goods include electronics, food crops, fuels, and minerals, most of which can be transported by land, sea or air without needing special or stringent control of the surrounding environment. However, for certain niche products such as vaccines and advanced chemical intermediates, cold chain transportation is required to maintain the temperature of the surrounding environment at a strictly defined temperature range. A cold chain is a temperature-controlled supply chain, where from production to storage to distribution, the items are constantly maintained in a defined low temperature range. This increased need for cold chain transportation has resulted in a huge demand for the cold chain market, and at the same time encouraging improvement in the existing products for cold chain transportation.

Temperature ranges for a cold chain are usually below ambient temperature, such as at 15° C., 2-8° C., 0° C., −10° C., and below −18° C., and this defined temperature must be strictly adhered to. Cold chain transportation methods to maintain low temperature engages either an active shipper or passive shipper. An active shipper involves the use of a thermostat-controlled container which is powered electronically, such as refrigerators or freezers, for accurate temperature control. Active shippers are often bulky, involve high costs and are not easily transported. In contrast, a passive shipper uses expanded polystyrene (EPS) or polyurethane (PU) cool box, gel packs, dry ice or freezer packs to maintain the desired low temperatures. The passive shipper would be a more appealing option as it is convenient for delivery, making it generally more environment-friendly and cost-effective.

The cold chain passive shipper technology for transporting items at below −18° C. is not well developed, and usually dry ice is used for maintaining this temperature. However, dry ice packing is inefficient, not economical, non-recyclable, and it also increases carbon tax emissions. Transportation temperature in the −18 to −32° C. range is especially desirable as it would allow transportation of precious vaccines, but there are not many commercial passive shipper cold chain products in the market for this temperature range.

As such there is a need to develop an efficient passive shipper technology which can sustain the desired temperature range of −18 to −32° C. for an extended period of time. desired temperature. There is therefore a need to provide a temperature control system that overcomes or at least ameliorates, one or more of the disadvantages described above.

SUMMARY

In an aspect, there is provided a thermal control system comprising an inorganic phase change material and an organic phase change material.

Advantageously, the thermal control system comprises two phase change materials (PCM) formulations in a new system design, with varied combinations of PCMs. In an embodiment, the thermal control system may comprise several inorganic salts in combination with various functional additives. The organic PCM formulation may include various fatty acids and hydrocarbons and functional additives.

Advantageously, the thermal control system may be able to maintain an extremely low temperature in the range of about −15° C. to about −40° C. without engaging an active shipper method that requires an electronically powered thermostat-controlled container. More advantageously, the thermal control system may avoid the use of dry ice, which is inefficient, not economical, non-recyclable and is high in carbon tax emissions.

Further advantageously, the working temperature and working duration of the thermal control system may be tunable, depending on the composition and configuration of the inorganic phase change material and the organic phase change material. Advantageously, the working duration may be tuned and varied, but may be up to about 12 hours. This may be a significant advantage over conventional PCMs which may only be operational for several hours. Advantageously, the working temperature may be in the range of about −15° C. to about −40° C. Further advantageously, the thermal control system may attain working temperature within 2 hours of initiating reaction. The phase change material (PCM) may initially be frozen or cooled to below −40° C. When items to be cooled are transported, the inorganic phase change material and organic phase change material may be placed together with the item to be cooled to provide a cooling effect.

More advantageously, the thermal control system may be reusable, may have zero carbon emission, may create no pollution and may have a long working duration. Advantageously, the thermal control system may be useful in a cold chain, in the pharmaceutical industry or in a freezer.

The thermal control system may have a significantly enhanced performance compared to conventional systems.

The inorganic phase change material may form a first layer and the organic phase change material may form a second layer, whereby the first layer and the second layer are physically distinct from each other.

The ratio of organic to inorganic phase change material may be varied, and the actual ratio may depend on the required temperature of the products. Both inorganic and organic layers may be mixed or packed as separate distinct layer, nevertheless each type of packing will have its own set of advantages and disadvantages.

Advantageously, when the first layer and the second layer are in direct contact with each other, heat penetration may be reduced and higher efficiency of cooling may be achieved.

The first layer may be the inner layer and the second layer may be the outer layer, or the first layer may be the outer layer and the second layer may be the inner layer. The inner layer may at least partially surround the item to be cooled, and the outer layer may at least partially surround the inner layer. The outer layer may substantially entirely surround the inner layer.

Advantageously, the inner layer may be adjacent to the item to be cooled. The inner layer may form a cold sink to maintain interior temperature, while the outer layer may form a thermal insulation barrier. Further advantageously, the two-layer structure of the thermal control system may enhance the performance of the thermal control system compared to any thermal control system having a single layer of phase change material. Advantageously, the inner layer may stabilize the temperature to minimize fluctuations in temperature, while the outer layer may be used as a cold sink to quench heat penetration from the outside environment to the inner layer, acting as the thermal-insulation barrier. Advantageously, the two-layer structure of the thermal control system may enable cooling of an item to be cooled at extremely low (−15° C. to about −40° C.) temperatures.

The thermal control system may further comprise a thermally insulating material. The thermally insulating material may at least partially surround the inorganic phase change material and the organic phase change material.

The thermally insulating material may be in the form of a container that provides thermal insulation to the inorganic phase change material and the organic phase change material. The container in which the item to be cooled and phase change materials are contained in may have a certain degree of thermal insulation. Advantageously, the cooling effect by the phase change material may build up within the container and maintain the internal temperature of the container at a temperature in the range of about −15° C. to about −40° C. Advantageously, different formulations of the phase change material and thermal control system may maintain the internal temperature of the container at different temperature ranges.

In another aspect, there is provided a method of preparing a thermal control system, the method comprising the step of contacting an inorganic phase change material with an organic phase change material.

In another aspect, there is provided a method for maintaining a temperature of an item, the method comprising the step of providing a thermal control system comprising an inorganic phase change material and an organic phase change material.

DEFINITIONS

The following words and terms used herein shall have the meaning indicated:

The word "aliphatic", for the purposes of this disclosure, refers to all non-aromatic hydrocarbons, including saturated, unsaturated, substituted and unsubstituted hydrocarbons. The aliphatic, for the purposes of disclosure may refer to waxes, which characteristically consist of short ($C_2$-$C_{12}$) or long ($C_{13}$-$C_{24}$) alkyl chains, may or may not contain unsaturated bonds, and may include various functional groups such as fatty acids, primary and secondary alcohols, ketones, aldehydes and fatty acid esters. The aliphatic, for the purposes of this disclosure may also refer to fatty acids, which characteristically consist of short ($C_2$-$C_{12}$) or long ($C_{13}$-$C_{24}$) alkyl chains and a carboxylic acid, and may or may not contain unsaturated bonds.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF OPTIONAL EMBODIMENTS

There is provided a thermal control system comprising an inorganic phase change material and an organic phase change material.

The inorganic phase change material and the organic phase change material may be physically mixed with each other. The mixing may result in a substantially uniform mixture of the inorganic phase change material and the organic phase change material. Advantageously, the mixing of the inorganic phase change material with the organic phase change material may reduce heat penetration.

The inorganic phase change material may form a first layer and the organic phase change material may form a second layer, whereby the first layer and the second layer are physically distinct from each other.

The ratio of organic to inorganic phase change material can be varied, and the actual ratio may depend on the required temperature of the products. Both inorganic and organic layers may be mixed or packed as separate distinct layer, nevertheless each type of packing will have its own set of advantages and disadvantages.

The organic phase change material and the inorganic phase change material may be present at a ratio in the range of about 1:1 to about 1:5 by weight, about 1:1 to about 1:2 by weight, about 1:2 to about 1:3 by weight, about 1:1 to about 1:4 by weight, about 1:2 to about 1:3 by weight, about 1:2 to about 1:4 by weight, about 1:2 to about 1:5 by weight, about 1:3 to about 1:4 by weight, about 1:3 to about 1:5 by weight or about 1:4 to about 1:5 by weight. More preferably, the organic phase change material and the inorganic phase change material may be present at a ratio of about 1:1 by weight. The first layer and the second layer may be separated by a layer of fluid. The fluid may be liquid or gas. The gas may be an elemental gas or a mixture of elemental gases. The mixture of elemental gas may be air, or the atmosphere of Earth. The first layer and second layer may be in direct contact with each other. There may be no layer of fluid in between the first layer and second layer.

Advantageously, when the first layer and the second layer are in direct contact with each other, heat penetration may be reduced and higher efficiency of cooling may be achieved.

The first layer may be the inner layer and the second layer may be the outer layer, or the first layer may be the outer layer and the second layer may be the inner layer. The inner layer may at least partially surround the item to be cooled, and the outer layer may at least partially surround the inner layer. The outer layer may substantially entirely surround the inner layer.

The outer layer and inner layer may be of the same temperature.

The outer layer may be of a relatively lower temperature than the inner layer. More preferably, the inner layer may be in the temperature range of about −20° C. to about −26° C., about −20° C. to about −22° C., about −20° C. to about −24° C., about −22° C. to about −24° C., about −22° C. to about −26° C., or about −24° C. to about −26° C., and the outer layer may have a temperature in the range of about −25 to −35° C., about −25° C. to about −27° C., about −25° C. to about −30° C., about −25° C. to about −32° C., about −27° C. to about −30° C., about −27° C. to about −32° C., about −27° C. to about −35° C., about −30° C. to about −33° C., about −30° C. to about −35° C., or about −33° C. to about −35° C., wherein the outer layer may be of a lower temperature than the inner layer.

The organic phase change material and the inorganic phase change material may be at a temperature below −15° C., below −17° C., below −20° C., below −22° C., below −25° C., below −27° C., below −30° C., below −32° C., or below −35° C.

The organic phase change material and the inorganic phase change material may be independently present at a thickness in the range of about 5 mm to about 3 cm, about 5 mm to about 1 cm, about 5 mm to about 2 cm, about 1 cm to about 2 cm, about 1 cm to about 3 cm, or about 2 cm to about 3 cm. The organic phase change material and the inorganic phase change material may be independently present at a thickness in the range of about 1.5 cm to about 2 cm, about 1.5 cm to about 1.7 cm, or about 1.7 cm to about 2 cm.

The inorganic phase change material may comprise a salt and a first additive.

The inorganic phase change material may be an aqueous solution.

The salt may comprise a first metal selected from group 1, group 2, group 7, group 8, group 9, group 10, group 12 or group 13 of the Periodic Table of Elements, and an anion.

The first metal may be selected from the group consisting of Na, Mg, K, Ca, Fe, Mn, Zn, Al and any mixture thereof, more preferably selected from the group consisting of Na, Mg, K, Ca and any mixture thereof.

The anion may be selected from the group consisting of $Cl^-$, $Br^-$, $F^-$, $I^-$, $SO_4^{2-}$, $NO_3^-$, $CO_3^{2-}$, $SiO_3^{2-}$, $S_2O_3^{2-}$, $CH_3COO^-$, $OH^-$, $HPO_4^{2-}$, $PO_4^{3-}$ and any mixture thereof, more preferably selected from the group consisting of $Cl^-$, $SO_4^{2-}$, $NO_3^-$ and any mixture thereof.

The inorganic phase change material may comprise about 5 wt % to about 35 wt % salt, more preferably about 10 wt % to about 30 wt % salt. The inorganic phase change material may comprise about 5 wt % to about 35 wt % salt, about 5 wt % to about 10 wt % salt, about 5 wt % to about 15 wt % salt, about 5 wt % to about 20 wt % salt, about 5 wt % to about 25 wt % salt, about 5 wt % to about 30 wt % salt, about 10 wt % to about 15 wt % salt, about 10 wt % to about 20 wt % salt, about 10 wt % to about 25 wt % salt, about 10 wt % to about 30 wt % salt, about 10 wt % to about 35 wt % salt, about 15 wt % to about 20 wt % salt, about 15 wt % to about 25 wt % salt, about 15 wt % to about 30 wt % salt, about 15 wt % to about 35 wt % salt, about 20 wt % to about 25 wt % salt, about 20 wt % to about 25 wt % salt, about 20 wt % to about 30 wt % salt, about 20 wt % to about 35 wt % salt, about 25 wt % to about 30 wt % salt, about 25 wt % to about 35 wt % salt, or about 30 wt % to about 35 wt % salt.

The first additive may be a nano-sized material, a micro-sized material or a mixture thereof. The first additive may comprise carbon, silica or any mixture thereof. The first additive may be selected from the group consisting of carbon-based fibre, fumed silica, porous silica, aerogel and glass sphere. The first additive may be a porous silica microstructure, carbon fiber nanostructure or a mixture thereof. Advantageously, the first additive may have good heat conductivity properties. Advantageously, the first additive may also improve the consistency of the inorganic phase change material.

The first additive may have a particle size in the range of about 10 nm to about 3 μm, about 10 nm to about 20 nm, about 10 nm to about 50 nm, about 10 nm to about 100 nm, about 10 nm to about 200 nm, about 10 nm to about 500 nm, about 10 nm to about 1 μm, about 10 nm to about 2 μm, about 20 nm to about 50 nm, about 20 nm to about 100 nm, about 20 nm to about 200 nm, about 20 nm to about 500 nm, about 20 nm to about 1 μm, about 20 nm to about 2 μm, about 20 nm to about 3 μm, about 50 nm to about 100 nm, about 50 nm to about 200 nm, about 50 nm to about 500 nm, about 50 nm to about 1 μm, about 50 nm to about 2 μm, about 50 nm to about 3 μm, about 100 nm to about 200 nm, about 100 nm to about 500 nm, about 100 nm to about 1 μm, about 500 nm to about 2 μm, about 500 nm to about 3 μm, about 1 μm to about 2 μm, about 1 μm to about 3 μm, or about 2 μm to about 3 μm.

The thermal conductivity of the first additive may be in the range of about 0.005 W/(m*K) to about 0.07 W/(m*K), about 0.005 W/(m*K) to about 0.01 W/(m*K), about 0.005 W/(m*K) to about 0.02 W/(m*K), about 0.005 W/(m*K) to about 0.05 W/(m*K), about 0.01 W/(m*K) to about 0.02 W/(m*K), about 0.01 W/(m*K) to about 0.05 W/(m*K), about 0.01 W/(m*K) to about 0.07 W/(m*K), about 0.02 W/(m*K) to about 0.05 W/(m*K), about 0.02 W/(m*K) to about 0.07 W/(m*K) or about 0.05 W/(m*K) to about 0.07 W/(m*K).

The first additive may comprise a microstructure and a nanostructure.

The first additive may comprise a microstructure having a particle size in the range of about 1 μm to about 3 μm and a thermal conductivity in the range of about 0.01 W/(m*K) to about 0.05 W/(m*K), about 0.005 W/(m*K) to about 0.01 W/(m*K), about 0.005 W/(m*K) to about 0.02 W/(m*K), about 0.01 W/(m*K) to about 0.02 W/(m*K), about 0.01 W/(m*K) to about 0.05 W/(m*K) or about 0.02 W/(m*K) to about 0.05 W/(m*K).

The first additive may comprise a nanostructure having a particle size in the range of about 10 nm to 300 nm, about 10 nm to about 20 nm, about 10 nm to about 50 nm, about 10 nm to about 100 nm, about 10 nm to about 200 nm, about 20 nm to about 50 nm, about 20 nm to about 100 nm, about 20 nm to about 200 nm, about 20 nm to about 300 nm, about 50 nm to about 100 nm, about 50 nm to about 200 nm, about 50 nm to about 300 nm, about 100 nm to about 200 nm, about 100 nm to about 300 nm or about 200 nm to about 300 nm, and a thermal conductivity in the range of about 0.005 W/(m*K) to about 0.07 W/(m*K), about 0.005 W/(m*K) to about 0.01 W/(m*K), about 0.005 W/(m*K) to about 0.02 W/(m*K), about 0.005 W/(m*K) to about 0.05 W/(m*K), about 0.01 W/(m*K) to about 0.02 W/(m*K), about 0.01 W/(m*K) to about 0.05 W/(m*K), about 0.01 W/(m*K) to about 0.07 W/(m*K), about 0.02 W/(m*K) to about 0.05 W/(m*K), about 0.02 W/(m*K) to about 0.07 W/(m*K) or about 0.05 W/(m*K) to about 0.07 W/(m*K).

The thermal conductivity of the nanostructure should be less than the thermal conductivity of the microstructure.

The porous silica microstructure may have a particle size in the range of about 1 μm to about 3 μm, about 1 μm to about 2 μm, or about 2 μm to about 3 μm. The thermal conductivity of the porous silica microstructure may be in the range of about 0.01 W/(m*K) to about 0.05 W/(m*K), about 0.005 W/(m*K) to about 0.01 W/(m*K), about 0.005 W/(m*K) to about 0.02 W/(m*K), about 0.01 W/(m*K) to about 0.02 W/(m*K), about 0.01 W/(m*K) to about 0.05 W/(m*K) or about 0.02 W/(m*K) to about 0.05 W/(m*K).

The carbon-based fibre nanostructure may have a particle size in the range of 10 nm to about 300 nm, about 10 nm to about 20 nm, about 10 nm to about 50 nm, about 10 nm to about 100 nm, about 10 nm to about 200 nm, about 20 nm to about 50 nm, about 20 nm to about 100 nm, about 20 nm to about 200 nm, about 20 nm to about 300 nm, about 50 nm to about 100 nm, about 50 nm to about 200 nm, about 50 nm to about 300 nm, about 100 nm to about 200 nm, about 100 nm to about 300 nm or about 200 nm to about 300 nm. The thermal conductivity of the carbon-based nanostructure may be in the range of about 0.005 W/(m*K) to about 0.05 W/(m*K), about 0.005 W/(m*K) to about 0.01 W/(m*K), about 0.005 W/(m*K) to about 0.02 W/(m*K), about 0.01 W/(m*K) to about 0.02 W/(m*K), about 0.01 W/(m*K) to about 0.05 W/(m*K), or about 0.02 W/(m*K) to about 0.05 W/(m*K).

The inorganic phase change material may comprise about 0.05 wt % to about 5 wt % first additive, more preferably about 0.1 wt % to about 3 wt % first additive. The inorganic phase change material may comprise about 0.05 wt % to about 0.1 wt % first additive, about 0.05 wt % to about 0.2 wt % first additive, about 0.05 wt % to about 0.5 wt % first additive, about 0.05 wt % to about 1 wt % first additive, about 0.05 wt % to about 2 wt % first additive, about 0.05 wt % to about 3 wt % first additive, about 0.1 wt % to about 0.2 wt % first additive, about 0.1 wt % to about 0.5 wt % first additive, about 0.1 wt % to about 1 wt % first additive, about 0.1 wt % to about 2 wt % first additive, about 0.1 wt % to about 3 wt % first additive, about 0.1 wt % to about 5 wt % first additive, about 0.2 wt % to about 0.5 wt % first additive, about 0.2 wt % to about 1 wt % first additive, about 0.2 wt % to about 2 wt % first additive, about 0.2 wt % to about 3 wt % first additive, about 0.2 wt % to about 5 wt % first additive, about 0.5 wt % to about 1 wt % first additive, about 0.5 wt % to about 2 wt % first additive, about 0.5 wt % to about 3 wt % first additive, about 0.5 wt % to about 5 wt % first additive, about 1 wt % to about 2 wt % first additive, about 1 wt % to about 3 wt % first additive, about 1 wt % to about 5 wt % first additive, about 2 wt % to about 3 wt % first additive, about 2 wt % to about 5 wt % first additive, or about 3 wt % to about 5 wt % first additive.

The inorganic phase change material may comprise about 5 wt % to about 35 wt % salt and about 0.05 wt % to about 5 wt % first additive, with the remaining wt % being formed by water to add to 100 wt %.

The inorganic phase change material may comprise about 5 wt % to about 35 wt % salt, about 5 wt % to about 15 wt % salt, about 5 wt % to about 25 wt % salt, about 15 wt % to about 25 wt % salt, about 15 wt % to about 35 wt % salt or 25 wt % to about 35 wt % salt, and about 0.05 wt % to about 5 wt % first additive, about 0.05 wt % to about 0.1 wt % first additive, about 0.05 wt % to about 0.5 wt % first additive, about 0.05 wt % to about 1 wt % first additive, about 0.1 wt % to about 0.5 wt % first additive, about 0.1 wt % to about 1 wt % first additive, about 0.1 wt % to about 5 wt % first additive, about 0.5 wt % to about 1 wt % first additive, about 0.5 wt % to about 5 wt % first additive or about 1 wt % to about 5 wt % first additive, with the remaining wt % being formed by water to add to 100 wt %.

Advantageously, the salt and the first additive may be mixed at different amounts to tune the working temperature or working duration of the inorganic phase change material.

The inorganic phase change material may comprise:
about 70 wt % to about 80 wt %, about 70 wt % to about 75 wt %, or about 75 wt % to about 80 wt % water;
about 15 wt % to about 25 wt %, about 15 wt % to about 20 wt %, or about 15 wt % to about 25 wt % $CaCl_2 \cdot 6H_2O$
about 3 wt % to about 4 wt %, about 3 wt % to about 3.5 wt %, or about 3.5 wt % to about 4 wt % NaCl;
about 0.2 wt % to about 0.7 wt %, about 0.2 wt % to about 0.5 wt %, or about 0.5 wt % to about 0.7 wt % porous silica microstructure; and
about 0.5 wt % to about 1.5 wt %, about 0.5 wt % to about 1 wt %, or about 1 wt % to about 1.5 wt % carbon fiber nanostructure,
such that the total wt % of each component adds to 100 wt %.

The inorganic phase change material may comprise:
about 75 wt % water;
about 20 wt % $CaCl_2 \cdot 6H_2O$
about 3.5 wt % NaCl;
about 0.5 wt % porous silica microstructure; and
about 1 wt % carbon fiber nanostructure.

The organic phase change material may comprise a hydrocarbon and a second additive.

The hydrocarbon may be an optionally functionalized aliphatic. The optionally functionalized aliphatic may be wax, fatty acid or a mixture thereof.

The wax may be an optionally substituted short aliphatic, wherein the short aliphatic may comprise 2 to 12 carbon atoms. The short aliphatic may comprise 2, 3, 4, 5, 6, 7, 8, 9, 10, 11 or 12 carbon atoms. The wax may be an optionally substituted long aliphatic, wherein the long aliphatic may comprise 13 to 24 carbon atoms. The long aliphatic may comprise 13, 14, 15, 16, 17, 18, 19, 20, 21, 22, 23 or 24 carbon atoms. The wax may optionally comprise a functional group such as an alcohol, aromatic, amide, ester, ketone or aldehyde.

The fatty acid may be a carboxylic acid of an optionally substituted short aliphatic, wherein the short aliphatic may comprise 2 to 12 carbon atoms. The short aliphatic may comprise 2, 3, 4, 5, 6, 7, 8, 9, 10, 11 or 12 carbon atoms. The fatty acid may be a carboxylic acid of an optionally substituted long aliphatic, wherein the long aliphatic may comprise 13 to 24 carbon atoms. The long aliphatic may comprise 13, 14, 15, 16, 17, 18, 19, 20, 21, 22, 23 or 24 carbon atoms.

The aliphatic may be saturated or unsaturated.

The optionally substituted aliphatic may be wax. The wax may comprise long alkyl chains and may be optionally substituted with functional groups such as fatty acids, primary and secondary long chain alcohols, unsaturated bonds, aromatics, amides, ketones and aldehydes. The wax may comprise a fatty acid ester.

The organic phase change material may comprise about 50 wt % to about 98 wt % hydrocarbon, more preferably about 92 wt % to about 97 wt % hydrocarbon. The organic phase change material may comprise about 50 wt % to about 98 wt % hydrocarbon, about 50 wt % to about 60 wt %, about 60 wt % to about 70 wt %, about 50 wt % to about 80 wt %, about 50 wt % to about 90 wt %, about 60 wt % to about 70 wt %, about 60 wt % to about 80 wt %, about 60 wt % to about 90 wt %, about 60 wt % to about 98 wt %, about 70 wt % to about 80 wt %, about 70 wt % to about 90 wt %, about 70 wt % to about 98 wt %, about 80 wt % to about 90 wt %, about 80 wt % to about 98 wt %, about 90 wt % to about 98 wt % hydrocarbon. The organic phase change material may comprise about 92 wt % to about 97 wt %, about 92 wt % to about 95 wt %, or about 95 wt % to about 97 wt % hydrocarbon.

The second additive may be a nano-sized material, a micro-sized material or a mixture thereof.

The second additive may comprise carbon, a second metal, an oxide of the second metal or any mixture thereof.

The second metal may be an element selected from group 4, group 10, group 11 or group 12 of the Periodic Table of Elements. The second metal may be selected from the group consisting of Cu, Au, Ag, Zn, Ti and any mixture thereof, more preferably Cu.

The oxide of the second metal may be ZnO or $TiO_2$.

The second additive may have a shape in the form of a particle, tube, rod or any mixture thereof.

The second additive may be selected from carbon nanotube, copper nanoparticle or a mixture thereof. Advantageously, the second additive may have good heat conductivity properties. Advantageously, the second additive may also improve the consistency of the organic phase change material.

The second additive may have a size in the range of about 10 nm to about 50 nm, about 20 nm to about 25 nm or about 25 nm to about 50 nm in diameter and about 2 nm to about 20 μm, about 2 nm to about 20 nm, about 2 nm to about 200 nm, about 2 nm to about 2 μm, about 20 nm to about 200 nm, about 20 nm to about 2 μm, about 20 nm to about 20 μm, about 200 nm to about 2 μm, about 200 nm to about 20 μm, or about 2 μm to about 20 μm, in length. The thermal conductivity of the second additive may be in the range of about 20 W/(m*K) to about 50 W/(m*K), about 20 W/(m*K) to about 25 W/(m*K), or about 25 W/(m*K) to about 50 W/(m*K).

The organic phase change material may comprise about 2 wt % to about 50 wt % second additive, more preferably about 3 wt % to about 7 wt % second additive. The organic phase change material may comprise about 2 wt % to about 50 wt % second additive, about 2 wt % to about 5 wt % second additive, about 2 wt % to about 10 wt % second additive, about 2 wt % to about 20 wt % second additive, about 5 wt % to about 10 wt % second additive, about 5 wt % to about 20 wt % second additive, about 5 wt % to about 50 wt % second additive, about 10 wt % to about 20 wt % second additive, about 10 wt % to about 50 wt % second additive, about 10 wt % to about 50 wt % second additive, or about 20 wt % to about 50 wt % second additive. The organic phase change material may comprise about 3 wt % to about 7 wt % second additive, about 3 wt % to about 5 wt % second additive or about 5 wt % to about 7 wt % second additive.

The organic phase change material may comprise about 50 wt % to about 98 wt % hydrocarbon and about 3 wt % to about 7 wt % second additive, such that the total wt % of each component adds to 100 wt %. The organic phase change material may comprise about 50 wt % to about 98 wt % hydrocarbon, about 50 wt % to about 60 wt %, about 60 wt % to about 70 wt %, about 50 wt % to about 80 wt %, about 50 wt % to about 90 wt %, about 60 wt % to about 70 wt %, about 60 wt % to about 80 wt %, about 60 wt % to about 90 wt %, about 60 wt % to about 98 wt %, about 70 wt % to about 80 wt %, about 70 wt % to about 90 wt %, about 70 wt % to about 98 wt %, about 80 wt % to about 90 wt %, about 80 wt % to about 98 wt %, about 90 wt % to about 98 wt % hydrocarbon, about 3 wt % to about 7 wt % second additive, about 3 wt % to about 5 wt % second additive or about 5 wt % to about 7 wt % second additive, such that the total wt % of each component adds to 100 wt %.

Advantageously, the hydrocarbon and second additive may be mixed at different amounts to tune the working temperature or working duration of the organic phase change material.

The organic phase change material may comprise:
about 65 wt % to about 75 wt %, about 65 wt % to about 70 wt %, or about 70 wt % to about 65 wt % $C_{11}H_{24}$ hydrocarbon;
about 15 wt % to about 25 wt %, about 15 wt % to about 20 wt %, or about 20 wt % to about 25 wt % $C_{12}H_{26}$ hydrocarbon;
about 2.5 wt % to about 7.5 wt %, about 2.5 wt % to about 5 wt %, or about 5 wt % to about 7.5 wt % $C_{13}H_{28}$ hydrocarbon;
about 1.5 wt % to about 2.5 wt %, about 1.5 wt % to about 2 wt %, or about 2 wt % to about 2.5 wt % carbon nanotube; and
about 2.5 wt % to about 3.5 wt %, about 2.5 wt % to about 3 wt %, or about 3 wt % to about 3.5 wt % copper nanoparticle, such that the total wt % of each component adds to 100 wt %.

The organic phase change material may comprise:
about 70 wt % $C_{11}H_{24}$ hydrocarbon;
about 20 wt % $C_{12}H_{26}$ hydrocarbon;
about 5 wt % $C_{13}H_{28}$ hydrocarbon;
about 2 wt % carbon nanotube; and
about 3 wt % copper nanoparticle.

The organic phase change material may comprise:
about 5 wt % to about 15 wt %, 5 wt % to about 10 wt %, or about 10 wt % to about 15 wt % hydrocarbon selected from the group consisting of $C_{10}H_{22}$, $C_{11}H_{24}$ and $C_{14}H_{30}$;
about 25 wt % to about 35 wt %, about 25 wt % to about 30 wt %, or about 30 wt % to about 35 wt % $C_{12}H_{26}$ hydrocarbon;
about 55 wt % to about 65 wt %, about 55 wt % to about 60 wt % or about 60 wt % to about 65 wt % $C_{13}H_{28}$ hydrocarbon; and
about 0.5 wt % to about 2 wt %, about 0.5 to about 1 wt % or about 1 wt % to about 2 wt % carbon nanostructure;
such that the total wt % of each component adds to 100 wt %.

The $C_{10}H_{22}$ hydrocarbon may be linear decane, having a melting point of −22° C. and a molecular weight of 142.3 g·mol$^{-1}$.

The $C_{11}H_{24}$ hydrocarbon may be linear undecane, having a melting point of −25° C. and a molecular weight of 156.31 g·mol$^{-1}$.

The $C_{12}H_{26}$ hydrocarbon may be linear dodecane, the $C_{13}H_{28}$ hydrocarbon may be linear tridecane and $C_{14}H_{30}$ hydrocarbon may be linear tetradecane.

The thermal control system may comprise:
about 35 wt % to about 40 wt %, about 35 wt % to about 37 wt % or about 37 wt % to about 40 wt % water;
about 7.5 wt % to about 12.5 wt %, about 7.5 wt % to about 10 wt % or about 10 wt % to about 12.5 wt % $CaCl_2.6H_2O$
about 1.5 wt % to about 2 wt %, about 1.5 wt % to about 1.7 wt %, or about 1.7 wt % to about 2 wt % NaCl;
about 0.1 wt % to about 0.35 wt %, 0.1 wt % to about 0.2 wt %, or about 0.2 wt % to about 0.35 wt % porous silica microstructure;
about 0.25 wt % to about 0.75 wt %, about 0.25 wt % to about 0.5 wt %, or about 0.5 wt % to about 0.75 wt % carbon fiber nanostructure,
about 32.5 wt % to about 37.5 wt %, about 32.5 wt % to about 35 wt %, or about 35 wt % to about 37.5 wt % $C_{11}H_{24}$ hydrocarbon;
about 7.5 wt % to about 12.5 wt %, about 7.5 wt % to about 10 wt %, or about 10 wt % to about 12.5 wt % $C_{12}H_{26}$ hydrocarbon;
about 1.25 wt % to about 3.75 wt %, about 1.25 wt % to about 2.5 wt %, or about 2.5 wt % to about 3.75 wt % $C_{13}H_{28}$ hydrocarbon;
about 0.75 wt % to about 1.25 wt %, about 0.75 wt % to about 1 wt %, or about 1 wt % to about 1.25 wt % carbon nanotube; and
about 1.25 wt % to about 1.75 wt %, about 1.25 wt % to about 1.5 wt %, about 1.5 wt % to about 1.75 wt % copper nanoparticle,
such that the total wt % of each component adds to 100 wt %.

The thermal control system may comprise:
about 37.5 wt % water;
about 10 wt % $CaCl_2.6H_2O$ about 1.75 wt % NaCl;
about 0.25 wt % porous silica microstructure;
about 0.5 wt % carbon fiber nanostructure;
about 35 wt % $C_{11}H_{24}$ hydrocarbon;
about 10 wt % $C_{12}H_{26}$ hydrocarbon;
about 2.5 wt % $C_{13}H_{28}$ hydrocarbon;
about 1 wt % carbon nanotube; and
about 1.5 wt % copper nanoparticle.

The thermal control system may comprise:
about 35 wt % to about 40 wt %, about 35 wt % to about 37 wt %, or about 37 wt % to about 40 wt % water;
about 7.5 wt % to about 12.5 wt %, about 7.5 wt % to about 10 wt %, or about 10 wt % to about 12.5 wt % $CaCl_2.6H_2O$
about 1.5 wt % to about 2 wt %, about 1.5 wt % to about 1.75 wt % or about 1.75 wt % to about 2 wt % NaCl;
about 0.1 wt % to about 0.35 wt %, 0.1 wt % to about 0.2 wt %, or about 0.2 wt % to about 0.35 wt % porous silica microstructure;
about 0.25 wt % to about 0.75 wt %, about 0.25 wt % to about 0.5 wt %, or about 0.5 wt % to about 0.75 wt % carbon fiber nanostructure,
about 2.5 wt % to about 7.5 wt %, about 2.5 wt % to about 5 wt % or about 5 wt % to about 7.5 wt % hydrocarbon selected from the group consisting of $C_{10}H_{22}$, $C_{11}H_{24}$ and $C_{14}H_{30}$;
about 12.5 wt % to about 17.5 wt %, about 12.5 wt % to about 15 wt %, or about 15 wt % to about 17.5 wt % $C_{12}H_{26}$ hydrocarbon;
about 27.5 wt % to about 32.5 wt %, about 27.5 wt % to about 30 wt %, or about 30 wt % to about 32.5 wt % $C_{13}H_{28}$ hydrocarbon; and
about 0.25 wt % to about 1 wt %, about 0.25 wt % to about 0.5 wt %, or about 0.5 wt % to about 1 wt % carbon nanostructure;
such that the total wt % of each component adds to 100 wt %.

The thermal control system may further comprise a thermally insulating material. The thermally insulating material may at least partially surround the inorganic phase change material and the organic phase change material.

The thermal control system may comprise more than one layer of thermally insulating material.

There may be an inner thermally insulating material which may at least partially surround the inorganic and organic phase change material, and an outer thermally insulating material which may at least partially surround the inner phase change material.

The thermally insulating material may be paper, polystyrene, rubber, wood, glass fiber, cork, polyurethane, and any combination thereof.

The inner thermally insulating material may be polystyrene, and the outer thermally insulating material may be paper.

The thermally insulating material may be in the form of a container that provides thermal insulation to the inorganic phase change material and the organic phase change material. The container in which the item to be cooled and phase change materials are contained in may have a certain degree of thermal insulation. Advantageously, the cooling effect by the phase change material may build up within the container and maintain the internal temperature of the container at a temperature in the range of about −15° C. to about −40° C. Advantageously, different formulations of the phase change material and thermal control system may maintain the internal temperature of the container at different temperature ranges.

There is also provided a method of preparing a thermal control system, the method comprising the step of contacting an inorganic phase change material with an organic phase change material.

The contacting step may be direct contact between the inorganic phase change material and the organic phase change material.

The contacting step may comprise the step of bringing the inorganic phase change material and the organic phase change material together with a layer of air in between.

The method of preparing a thermal control system may further comprise the step of at least partially surrounding an item to be cooled with the inorganic phase change material and the organic phase change material.

The method of preparing a thermal control system may further comprise the step of at least partially surrounding the inorganic phase change material and the organic phase change material with a thermally insulating material.

The method of preparing a thermal control system may further comprise the step of at least partially surrounding the inorganic phase change material and the organic phase change material with more than one thermally insulating material.

There is also provided a method for maintaining a temperature of an item, the method comprising the step of providing a thermal control system comprising an inorganic phase change material and an organic phase change material.

The method for maintaining a temperature of an item may further comprise the step of contacting or at least partially surrounding an item to be cooled with the thermal control system.

The method for maintaining a temperature of an item may further comprise the step of pre-cooling the organic phase change material and/or the inorganic phase change material to a temperature below −15° C. prior to contacting with the item to be cooled.

The temperature may be maintained in the range of about −15° C. to about −40° C. for up to 12 hours.

The item may be agricultural produce, seafood, frozen food, photographic film, chemical reagent, enzyme, protein, pharmaceutical drug and any mixture thereof.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 is a schematic representation showing the difference between individual packing and combined packing of the organic phase change material (PCM) layer and the inorganic PCM layer.

FIG. 2 is a graph showing the differential scanning calorimetry of hydrocarbons (mixture of $C_{11}$-$C_{14}$)+carbon additives.

FIG. 3 is a graph showing the differential scanning calorimetry of hydrocarbons (mixture of $C_{10}$-$C_{14}$)+carbon additives.

FIG. 4 is a graph showing the differential scanning calorimetry of NaCl+$CaCl_2$)+carbon additives+silica-based micro-particles.

FIG. 5 refers to a thermogravimetric analysis image of paraffin wax.

FIG. 6 refers to a thermogravimetric analysis image of tetracosane.

FIG. 7 refers to a photograph image showing the set up for the reliability test for the thermal control system comprising NaCl+$CaCl_2$)+carbon additives+silica-based micro-particles.

FIG. 8 refers to a graph showing the temperature profile for the thermal control system comprising NaCl+$CaCl_2$)+carbon additives+silica-based micro-particles.

FIG. 9 refers to a graph showing the temperature profile of hydrocarbons (mixture of $C_{11}$-$C_{14}$)+carbon additives.

FIG. 10 refers to a graph showing the temperature profile of hydrocarbons (mixture of $C_{10}$-$C_{14}$)+carbon additives.

FIG. 11 refers to a graph showing the temperature profile of NaCl+$CaCl_2$)+carbon additives+silica-based micro-particles.

FIG. 12 refers to a graph showing the temperature profile of PCM1+PCM3 thermal control system, where PCM1:PCM3=1:1.

FIG. 13 refers to a graph showing the temperature profile of PCM1+PCM3 thermal control system, where PCM1:PCM3=7:3.

EXAMPLES

Non-limiting examples of the invention will be further described in greater detail by reference to specific Examples, which should not be construed as in any way limiting the scope of the invention.

Example 1: Materials and Methods

NaCl, $MgCl_2$, KCl, $CaCl_2$), $Na_2SO_4$, $MgSO_4$, $K_2SO_4$, $CaSO_4$, $NaNO_3$, $Mg(NO_3)_2$, $KNO_B$, and $Ca(NO_3)_2$ were purchased from Sigma Aldrich (St. Paul, Minneapolis, USA) and fatty acids including carboxylic acids of the short-($C_2$ to $C_{12}$) and long-($C_{13}$ to $C_{24}$) alkyl chains were purchased from TCI (Tokyo, Japan). Waxes of short-($C_6$ to $C_{12}$) and long-($C_{13}$ to $C_{24}$) chained hydrocarbons were purchased from Alfa Aesar (Ward Hill, Mass., USA).

Differential Scanning calorimetry (DSC)

Photo differential scanning calorimeter (DSC Q100), TA instruments was used to measure phase change temperature (e.g. melting point) and heat capacity.

DSC measurements were taken as follows:
measure out sample between 4 mg-7 mg and place in DSC pan
seal pan with the sample encapsulating press
place sealed pan into machine
key in weight to programme, temperature range (−60° C. to −10° C.), number of cycles (3)
run sample
analyse generated data to get melting point and heat capacity Thermogravimetry Analysis (TGA)

Thermogravimetric analyser (TGA Q500), TA Instruments was used to measure the thermal stability of a material (decomposition temperature of the material).

TGA measurements were taken as follows:
torch TGA pan
tare weight on machine
weigh 10-20 mg sample into the pan, by reading off the weight via the computer monitor (means must take out and hang back the pan to check weight until weight is within range)
key in temperature range (25° C. to 400° C.) and ram (10-20° C./min)
run sample
analyse generated data to get decomposition temperature Datalogger with PT-100 Sensor Datalogger: GL-840M, Graphtec PT100 sensors: PT-100-5-T, ESEL Pte. Ltd. were used to measure the temperature change during prototype testing.

Datalogger and sensor measurements were taken as follows:
connect sensor to datalogger
fit sensor to positions to be tested
start datalogger
stop when desired duration has been tested
convert and analyse data Example 2: Formulations Inorganic Phase Change Material (PCM) Formulation In order to enhance the performance of overall cool box system, an inorganic-based phase change material was developed. It comprises an aqueous solution of one or two or multiple salts and different functional additives. The salt concentration was in the range of 10-30% using salts including NaCl, $MgCl_2$, KCl, $CaCl_2$), $Na_2SO_4$, $MgSO_4$, $K_2SO_4$, $CaSO_4$, $NaNO_3$, $Mg(NO_3)_2$, $KNO_B$, and $Ca(NO_3)_2$. The functional additives included carbon-based fibers, silica-based nano-sized or micro-sized materials, such as fumed silica, aerogel, glass spheres or others at 0.1%-3% concentration. These ingredients were mixed at different ratios to tune the working temperature or working duration of the phase change material.

In an exemplary formulation, the respective weight of each component as indicated below was mixed and a mechanical stirrer was used to mix the mixture until it was homogeneously blended.

Water 100 g
NaCl 5 g
$CaCl_2$) 20 g
Carbon Nanotube (nanoparticle) 50 mg
$CaCO_3$ 10 mg
$SiO_2$ 30 mg Organic Phase Change Material (PCM) Formulation The organic-based phase change material (PCM) formulations contained fatty acids, wax, or a mixture of both in different portions and other functional nanoparticles. The fatty acids included carboxylic acids of the short-($C_2$ to $C_{12}$) and long-($C_{13}$ to $C_{24}$) alkyl chains. The waxes contained short-($C_6$ to $C_{12}$) and long-($C_{13}$ to $C_{24}$) chained hydrocarbons; the functional nanoparticles was selected from copper-based nanostructures or carbon-based nanostructures. The nanostructures were in the form of nanoparticles, nanotubes or nanorods or a combination thereof. The nano-structures were used to manage thermal regulation. Similar to the inorganic PMC, these ingredients can be mixed at different ratios of each different component to tune the working temperature or working duration.

In an exemplary formulation, the respective weight of each component as indicated below was mixed, heated to 100° C. and a mechanical stirrer was used to mix the mixture for about 1 hour until it was homogeneously blended.

$C_{10}H_{22}$, 3.5 kg
$C_{11}H_{24}$, 1 kg
$C_{12}H_{26}$, 470 g
Copper nanoparticle, 5 g
Carbon nano fibre 25 g Example 3: Design of Device The above PCM mixtures were transferred to a container or bag and tightly sealed. The container or bag was subsequently placed in a freezer which was set to a temperature based on the working temperature range of the PCM. For example, for a working temperature range of −10° C., and if the freezing point of the PCM as tested by DSC (see below) was around −11° C. to −9° C., then the PCM was placed in a −20° C. freezer to freeze.

An appropriate number of containers or bags of frozen PCM were placed in a prototype test box, and the box was closed for testing in a temperature range of:
−24° C. to −20° C.; or
−18° C.

These testing temperatures were selected based on the temperature ranges that are commonly used in grocery and pharmaceutical logistics.

To achieve better performance, a combination of different phase change material (PCM) formulations can be used, either physically mixed or packed separately as seen in FIG. 1. In FIG. 1, 101 refers to an individual packing design and 102 refers to a combined packing design. In each case, an organic PCM layer (103) which is the top or outer layer (105) in relation to the item to be cooled, acts as a thermal insulation barrier, while the inorganic PCM layer (104) which is the bottom or inner layer (106) in relation to the item to be cooled, acts as a cold sink to maintain interior temperature. The difference between individual packing (101) and combined packing (102) is that in individual packing (101), there is an air gap (107) between the PCM packs which result in heat penetration, which effectively lowers efficiency, whereas in combined packing (102), there is no air gap (108) between the PCM layers, reducing heat penetration and effectively increasing efficiency.

Different types of PCM, for example organic and inorganic PCMs, which may also be eutectic PCMs, may be used in different ratios to produce cold boxes of different working temperature and duration. In fact, for PCMs that are physically mixed together in the packaging, the heat penetration which would be present if PCMs were individually packed are theoretically reduced. The design principle of a dual PCM system having an inner layer and an outer layer relative to the item to be cooled, is that the dual-PCM system can enhance the performance of the thermal control system than any single layer PCM system, as the inner layer stabilizes the temperature so that temperature fluctuation of the system can be further minimized. At the same time, the outer layer is used as a "cold sink" to quench the heat penetration from the outside environment into the inner layer, effectively acting as a thermal-insulation barrier. This dual-PCM design enhances the performance of the thermal control system significantly, especially at an extremely low-temperature range.

Example 4: Performance Evaluation

To determine which PCM is suitable for the thermal control system, the respective PCMs were subjected to the following tests:

Differential Scanning calorimetry (DSC): to determine the melting temperature range and heat capacity of the PCM. The melting temperature range should be within or below the working temperature range of the thermal control system to be considered.

Thermal Gravimetric Analysis (TGA): to determine the decomposition temperature and therefore thermal stability of a material.

Reliability Test: Datalogger with PT100 sensor was used for measurement of temperature change during prototype testing to test how long the frozen PCM takes to reach room temperature. A longer duration would be better.

Simulation Test: packing all contents in the thermal control system and monitoring the temperature profile. This simulates a realistic thermal control system, something that may be used in real-life, and thus would help to assess the feasibility of the PCM system design and assembly.

Differential Scanning Calorimetry (DSC)

DSC was conducted to determine the latent heat and melting point of the PCM. Below are examples of three short listed PCMs:

a) Hydrocarbons (mixture of $C_{11}$-$C_{14}$)+Carbon additives
The formulation was made by stirring a mixture of $C_{11}H_{24}$ hydrocarbons (70%), $C_{12}H_{26}$ hydrocarbons (20%), $C_{13}H_{28}$ hydrocarbons (5%), carbon nanotube (CNT) (2%), and copper nanoparticle (3%) for 20 minutes.

b) Hydrocarbons (mixture of $C_{10}$-$C_{14}$)+Carbon additives;
The formulation was made by stirring a mixture of $C_{10}H_{22}$, $C_{11}H_{24}$ and $C_{14}H_{30}$ hydrocarbons (8-9.5%), $C_{12}H_{26}$ hydrocarbons (30%) and $C_{13}H_{28}$ hydrocarbons (60%), and carbon nanostructure (0.5-2%) for 20 minutes.

c) Sodium chloride+Calcium chloride+carbon additive+silica-based micro-materials.
The formulation was made by stirring a mixture of water (75%), $CaCl_2$*$6H_2O$ (20%), $K_2SO_4$ (3.5%), porous silica microstructure (0.5%) and carbon fiber nano-structure (1%) for 20 minutes. During this process, a chemical reaction to generate CaSO$_4$ occurs, which is important for the sustainable performance of the formulation.

The DSC spectrum can be seen in FIG. 2, FIG. 3 and FIG. 4, respectively. The respective phase change temperatures were all found to be within a tolerable temperature range in different containers for the purposes of the thermal control system.

Thermal Gravimetric Analysis (TGA)

From the TGA images of paraffin wax and tetracosane (FIGS. 5 and 6), it can be seen that the decomposition temperature was approximately 200° C. or above, which was significantly higher than the working temperature range of the PCMs. This shows that the PCMs are safe to use without decomposition within the working temperature.

Reliability Test

A reliability test is conducted by freezing a PT100 thermocouple with the PCM in a centrifuge tube, and logging the temperature as the PCM melts at room temperature as seen in FIG. 7 conducted for NaCl. The temperature profile of the melting cycle is as seen in FIG. 8 where it takes about half an hour to reach −8° C.

From the reliability test, it can be seen that the inventive formulation with NaCl takes a longer time to reach room temperature compared to pure water when starting from the frozen state. Thus it is evident that the inventive formulation has better properties than pure ice packs for maintaining low temperature.

Simulation Test

For performance evaluation, various PCMs were placed in a container for the real-life simulated tests. More specifically, several types of PCMs were tested:
 a) Hydrocarbons (mixture of C$_{11}$-C$_{14}$)+Carbon additives
 b) Hydrocarbons (mixture of C$_{10}$-C$_{14}$)+Carbon additives
 c) NaCl+CaCl$_2$+carbon additives+silica-based micro-materials I
 d) PCM1+PCM3 system The formulation was made by mixing formulation (a) and formulation (c) for a dual-PCM thermal control system.

The temperature profile can be seen in FIG. 9, FIG. 10, FIG. 11, FIG. 12 and FIG. 13.

It was therefore shown that the inventive formulations can act as PCM coolants at a working temperature in the range of −20 to −24° C. and for a duration in the range of 3 to 10 hours.

INDUSTRIAL APPLICABILITY

The thermal control system may be useful in cold chain transport, especially in the pharmaceutical industry. The thermal control system may be useful in expanded polystyrene boxes or polyurethane boxes for maintaining the temperature of the item to be cooled below a desired temperature. The thermal control system may be useful in transporting agricultural produce, seafood, frozen food, photographic film, chemical reagent, enzyme, protein, and pharmaceutical drugs that require cold chain transport. The thermal control system may also have potential applications in green buildings, electronic cooling devices and heat sinks.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A thermal control system comprising an inorganic phase change material and an organic phase change material, wherein:
   the organic phase change material and the inorganic phase change material are present at a ratio in a range of 1:1 by weight to 1:5 by weight; and
   the inorganic phase change material comprises a salt and a first additive, wherein the first additive is selected from the group consisting of carbon-based fiber, fumed silica, porous silica, aerogel, and glass sphere.

2. The thermal control system according to claim 1, wherein the inorganic phase change material and the organic phase change material are physically mixed with each other, or wherein the inorganic phase change material forms a first layer and the organic phase change material forms a second layer, whereby the first layer and the second layer are physically distinct from each other.

3. The thermal control system according to claim 1, wherein the organic phase change material and the inorganic phase change material are independently present at a thickness in the range of 5 mm to 3 cm.

4. The thermal control system according to claim 1, wherein the first layer and the second layer are separated by a layer of fluid or are in direct contact with each other, or wherein the first layer is the inner layer and the second layer is the outer layer, or the first layer is the outer layer and the second layer is the inner layer, relative to an item to be cooled, wherein the inner layer at least partially surrounds the item to be cooled, and the outer layer at least partially surrounds the inner layer, and wherein the outer layer and inner layer are of the same temperature or the outer layer is of a relatively lower temperature than the inner layer.

5. The thermal control system according to claim 1, wherein the salt comprises a first metal selected from group 1, group 2, group 7, group 8, group 9, group 10, group 12, or group 13 of the Periodic Table of Elements, and an anion, and wherein the first additive is a nano-sized material, a micro-sized material, or a mixture thereof, or wherein the thermal conductivity of the first additive is in the range of about 0.005 W/(m*K) to about 0.07 W/(m*K).

6. The thermal control system according to claim 5, wherein the inorganic phase change material comprises 5 wt. % to 35 wt. % salt.

7. The thermal control system according to claim 5, wherein the inorganic phase change material comprises:
   about 70 wt. % to about 80 wt. % water;
   about 15 wt. % to about 25 wt. % CaCl$_2$.6H$_2$O;
   about 3 wt. % to about 4 wt. % NaCl;
   about 0.2 wt. % to about 0.7 wt. % porous silica microstructure; and
   about 0.5 wt. % to about 1.5 wt. % carbon fiber nanostructure,
   such that the total wt. % of each component adds to 100 wt. %.

8. The thermal control system according to claim 1, wherein the organic phase change material comprises a hydrocarbon and a second additive, wherein the hydrocarbon is an optionally functionalized aliphatic and wherein the second additive is a nano-sized material, a micro-sized material, or a mixture thereof, or wherein the thermal conductivity of the second additive is in the range of about 20 W/(m*K) to 50 W/(m*K).

9. The thermal control system according to claim 8, wherein the organic phase change material comprises about 50 wt. % to about 98 wt. % hydrocarbon.

10. The thermal control system according to claim 8, wherein the organic phase change material comprises:

about 65 wt. % to about 75 wt. % $C_{11}H_{24}$ hydrocarbon;
about 15 wt. % to about 25 wt. % $C_{12}H_{26}$ hydrocarbon;
about 2.5 wt. % to about 7.5 wt. % $C_{13}H_{28}$ hydrocarbon;
about 1.5 wt. % to about 2.5 wt. % carbon nanotube; and
about 2.5 wt. % to about 3.5 wt. % copper nanoparticle,
such that the total wt. % of each component adds to 100 wt. %.

11. The thermal control system according to claim 8, wherein the organic phase change material comprises:
about 5 wt. % to about 15 wt. % hydrocarbon selected from the group consisting of $C_{10}H_{22}$, $C_{11}H_{24}$, and $C_{14}H_{30}$;
about 25 wt. % to about 35 wt. % $C_{12}H_{26}$ hydrocarbon;
about 55 wt. % to about 65 wt. % $C_{13}H_{28}$ hydrocarbon; and
about 0.5 wt. % to about 2 wt. % carbon nanostructure;
such that the total wt. % of each component adds to 100 wt. %.

12. The thermal control system according to claim 1 comprising:
about 35 wt. % to about 40 wt. % water;
about 7.5 wt. % to about 12.5 wt. % $CaCl_2.6H_2O$;
about 1.5 wt. % to about 2 wt. % NaCl;
about 0.1 wt. % to about 0.35 wt. % porous silica microstructure;
about 0.25 wt. % to about 0.75 wt. % carbon fiber nanostructure,
about 32.5 wt. % to about 37.5 wt. % $C_{11}H_{24}$ hydrocarbon;
about 7.5 wt. % to about 12.5 wt. % $C_{12}H_{26}$ hydrocarbon;
about 1.25 wt. % to about 3.75 wt. % $C_{13}H_{28}$ hydrocarbon;
about 0.75 wt. % to about 1.25 wt. % carbon nanotube; and
about 1.25 wt. % to about 1.75 wt. % copper nanoparticle,
such that the total wt. % of each component adds to 100 wt. %.

13. The thermal control system according to claim 1 comprising:
about 35 wt. % to about 40 wt. % water;
about 7.5 wt. % to about 12.5 wt. % $CaCl_2.6H_2O$;
about 1.5 wt. % to about 2 wt. % NaCl;
about 0.1 wt. % to about 0.35 wt. % porous silica microstructure;
about 0.25 wt. % to about 0.75 wt. % carbon fiber nanostructure,
about 2.5 wt. % to about 7.5 wt. % hydrocarbon selected from the group consisting of $C_{10}H_{22}$, $C_{11}H_{24}$ and $C_{14}H_{30}$;
about 12.5 wt. % to about 17.5 wt. % $C_{12}H_{26}$ hydrocarbon;
about 27.5 wt. % to about 32.5 wt. % $C_{13}H_{28}$ hydrocarbon; and
about 0.25 wt. % to about 1 wt. % carbon nanostructure, such that the total wt. % of each component adds to 100 wt. %.

14. The thermal control system according to claim 1, further comprising a thermally insulating material at least partially surrounding the inorganic phase change material and the organic phase change material.

15. The thermal control system according to claim 14, comprising an inner thermally insulating material which at least partially surrounds the inorganic and organic phase change material, and an outer thermally insulating material which at least partially surrounds the inner phase change material.

16. A method of preparing a thermal control system, the method comprising a step of contacting an inorganic phase change material with an organic phase change material, wherein:
the organic phase change material and the inorganic phase change material are present at a ratio in a range of 1:1 by weight to 1:5 by weight; and
the inorganic phase change material comprises a salt and a first additive, wherein the first additive is selected from the group consisting of carbon-based fiber, fumed silica, porous silica, aerogel, and glass sphere.

17. The method according to claim 16, wherein the contacting step results in direct contact between the inorganic phase change material and the organic phase change material, or wherein the contacting step comprises the step of bringing the inorganic phase change material and the organic phase change material together with a layer of fluid in between.

18. The method according to claim 16, further comprising a step of at least partially surrounding an item to be cooled with the inorganic phase change material and the organic phase change material, or further comprising a step of at least partially surrounding the inorganic phase change material and the organic phase change material with a thermally insulating material.

19. A method for maintaining a temperature of an item, the method comprising a step of providing a thermal control system comprising an inorganic phase change material and an organic phase change material, wherein:
the organic phase change material and the inorganic phase change material are present at a ratio in a range of 1:1 by weight to 1:5 by weight; and
the inorganic phase change material comprises a salt and a first additive, wherein the first additive is selected from the group consisting of carbon-based fiber, fumed silica, porous silica, aerogel and glass sphere.

20. The method according to claim 19, further comprising steps of pre-cooling the organic phase change material and/or the inorganic phase change material to a temperature below −15° C., and contacting or at least partially surrounding an item to be cooled with the thermal control system.

* * * * *